(12) United States Patent
Zhang

(10) Patent No.: US 8,427,064 B2
(45) Date of Patent: Apr. 23, 2013

(54) ELECTRONIC BALLAST CIRCUIT FOR FLUORESCENT LAMPS

(75) Inventor: Haibo Zhang, Ottawa (CA)

(73) Assignee: Coolumen Corporation (CA)

( * ) Notice: Subject to any disclaimer, the term of this patent is extended or adjusted under 35 U.S.C. 154(b) by 353 days.

(21) Appl. No.: 12/765,066

(22) Filed: Apr. 22, 2010

(65) Prior Publication Data

US 2011/0260634 A1    Oct. 27, 2011

(51) Int. Cl.
*H05B 41/16* (2006.01)
(52) U.S. Cl.
USPC ........ 315/247; 315/209 R; 315/224; 315/225; 315/291
(58) Field of Classification Search .............. 315/209 R, 315/224, 225, 247, 291, 185 S
See application file for complete search history.

(56) References Cited

U.S. PATENT DOCUMENTS

| | | | |
|---|---|---|---|
| 6,100,644 A | 8/2000 | Titus | |
| 6,545,431 B2 | 4/2003 | Hui et al. | |
| 6,781,323 B1 * | 8/2004 | Ching-Ho et al. | 315/247 |
| 2003/0001516 A1 * | 1/2003 | Newman et al. | 315/224 |
| 2004/0183460 A1 * | 9/2004 | Van Casteren | 315/209 R |
| 2010/0039038 A1 * | 2/2010 | Lam et al. | 315/224 |

OTHER PUBLICATIONS

Calleja, Antonio et al, "Analysis and Experimental Results of a Single-Stage High-Power-Factor Electronic Ballast Based on Flyback Converter," IEEE Transactions on Power Electronics, Nov. 1999, pp. 998-1006, vol. 14 No. 6, IEEE.

Chuang, Yin-Chun et al, "Single-Stage Single-Switch High-Power-Factor Electronic Ballast for Fluorescent Lamps," IEEE Transactions on Industry Applications, Nov./Dec. 2007, pp. 1434-1440, vol. 43 No. 6, IEEE.
Cosby, Melvin C. et al, "A resonant Inverter for Electronic Ballast Applications," IEEE Transactions on Industrial Electronics, Aug. 1994, 418-425, vol. 41 No. 4, IEEE.
Ponce, M. et al, "A Novel High-Power-Factor Single-Swithc Electronic Ballast for Compact Fluorescent Lamps," Proceedings of the IEEE 2000 International Power Electronics Congress, 2000, pp. 194-198, CIEP.
Ponce, Mario et al, "High-Efficient Integrated Electronic Ballast for Compact Fluorescent Lamps," IEEE Transactions on Power Electronics, Mar. 2006, pp. 532-541, vol. 21 No. 2, IEEE.
Ribas, Javier et al "Low-Cost Single-Stage Electronic Ballast Based on Self-Oscillating resonant Inverter Integrated with Buck-Boost PFC Circuit," IEEE Transactions on Industrial Electronics, Dec. 2001, pp. 1196-1204, vol. 48 No. 6, IEEE.

(Continued)

*Primary Examiner* — Thuy Vinh Tran
*Assistant Examiner* — Anthony Arpin
(74) *Attorney, Agent, or Firm* — Laubscher & Laubscher, P.C.

(57) ABSTRACT

Disclosed is a single switch integrated electronic ballast circuit for a fluorescent lamp, comprising an input for receiving a rectified DC voltage; a power factor correction portion for shaping the input line current to substantially a sinusoidal waveform and in phase with the rectified voltage, wherein the power factor correction portion includes capacitors; an energy storage portion for storing energy during dimming operations of the fluorescent lamp, wherein the capacitors also form part of the energy storage portion; an inverter with a resonant tank forming a resonant circuit for converting the DC voltage to an AC voltage to be delivered to the lamp; and a single switch for: 1) shaping the input line current to a substantially sinusoidal waveform as part of the power factor correction portion; and 2) providing a square voltage waveform across the input of the resonant circuit resulting in a substantially symmetrical waveform across the output of the resonant circuit.

14 Claims, 16 Drawing Sheets

OTHER PUBLICATIONS

Tao, Fengfeng et al, "An Interleaved Single-Stage Power-Factor-Correction Electronic Ballast," Proceedings of the IEEE 2000 Applied Power Electronics Conference and Exposition, 2000, pp. 617-623, vol. 1, APEC.

Wood, Peter N., "Flourescent Ballast Design Using Passive P.F.C. and Crest Factor Control," Preceedings of the IEEE 1998 Industry Applications Conference, Thirty-Third Annual Meeting, 1998, pp. 2076-2081, vol. 3, IEEE.

* cited by examiner

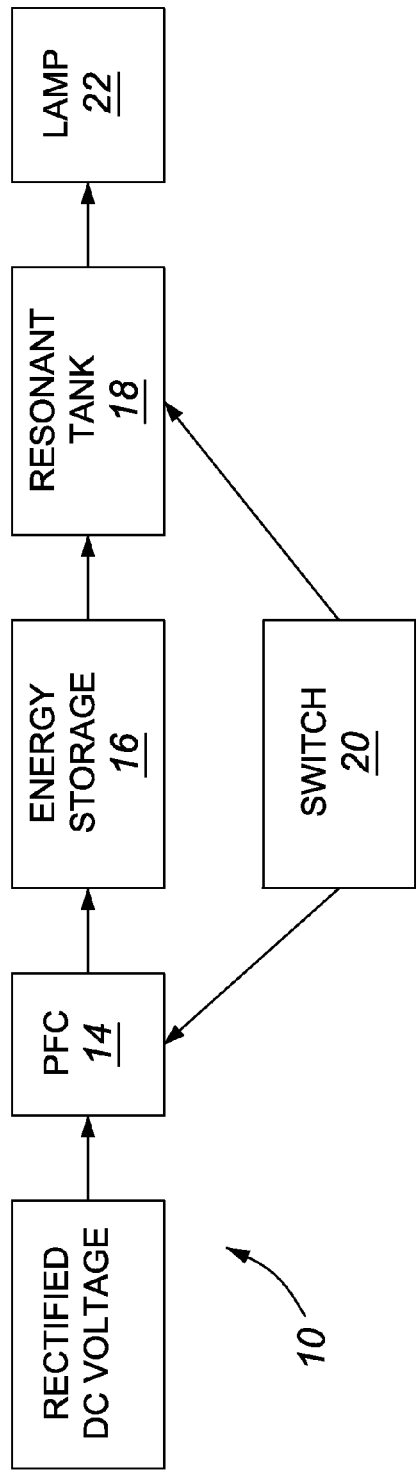
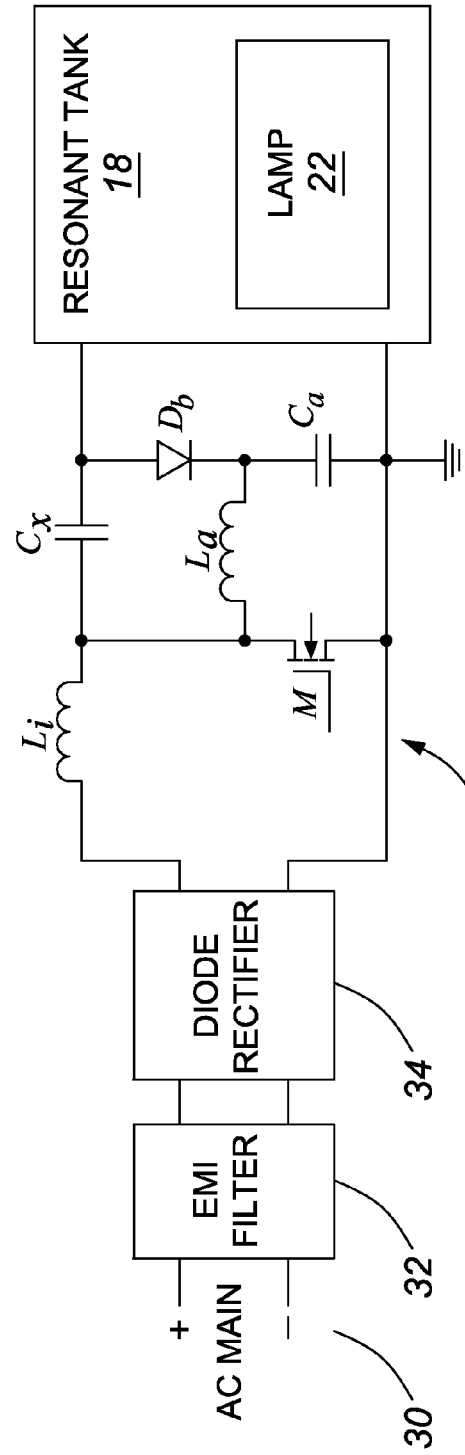
FIG. 2a
FIG. 2b

ELECTRONIC BALLAST CIRCUIT FOR
FLUORESCENT LAMPS

FIELD OF THE INVENTION

The present invention relates to a ballast circuit for fluorescent lamps.

BACKGROUND OF THE INVENTION

In response to the emissions reduction plea, governments of various countries have written policies to ban traditional incandescent lamps and advocate the use of compact fluorescent lamps (CFL). Despite the impending policies (such policies will be in effect as early as 2012), CFLs are already widely used due to their high lamp efficacy and long lamp lifetime. In comparison to incandescent lamps, CFLs only consumes one third as much electricity to have the same light output. In addition, CFLs create less heat (much of the incandescent lamp's energy is lost as heat) and their lamp lifetime can be up to ten times as longer. Therefore, since CFLs consume less energy and do not need to be replaced as often, they offer significant energy savings from both the utility and consumer standpoint in the long run.

The design of the electronic ballast circuit that drives a CFL is the major hurdle in the development of a high performance dimmable CFL. The electronic ballast is installed at the base of each CFL and it is used to perform essential lamp functions such as proper lamp ignition and lamp current stabilization. The majority of commercial CFLs (standard or dimmable) do not have any power factor correction (PFC) circuit. Without a PFC circuit, the ballast creates a highly distorted input current waveform because it draws current from the utility during the peak of the input AC voltage waveform for a relatively short period of time. Consequential to the distorted input current waveform drawn by the ballast, the CFL's power factor is quite low (typically 0.5 to 0.6). With regards to the performance of dimmable CFLs, its dimming range is very narrow when used in conjunction with standard phase-cut dimmers. Also, it has been noted that when the lamp is dimmed, flickering light output can be observed and in some cases, the lamp is unable to sustain normal operation.

The low power factor associated with CFLs are widely known, and have thus been addressed by using an electronic ballast that consists of a power factor correction (PFC) stage and a resonant inverter as shown in FIG. 1. This two stage ballast design is a typical solution to the power factor problem. The PFC stage allows the ballast circuit to draw a nearly sinusoidal line current at the input to achieve high input power factor. The resonant inverter, on the other hand, is responsible for the basic ballast functions (e.g. provide sufficient lamp ignition voltage across the lamp; stabilize the lamp current once the lamp is started; etc.). Although this two-stage configuration achieves high power factor at the input while performing the necessary ballast functions, it requires three active switches and a bulky, high voltage DC-link capacitor. As a result, the circuit is expensive and is quite bulky. In addition, since there are two power conversion stages, the efficiency of the circuit is also quite low.

SUMMARY OF THE INVENTION

A single switch integrated electronic ballast circuit for fluorescent lamps is disclosed.

The invention provides a single switch integrated ballast circuit for a fluorescent lamp, comprising: an input for receiving a rectified DC voltage; a power factor correction portion for shaping the input line current to substantially a sinusoidal waveform and in phase with the rectified DC voltage; thereby achieving high input power factor; an energy storage portion for storing energy during dimming operations; and an inverter with a resonant tank for converting the DC voltage to an AC voltage to be delivered to the lamp.

The ballast circuit in accordance with the teachings of this invention comprises a single switch. The function of the switch is to provide a square voltage waveform across the input of the resonant circuit; thereby providing a more symmetrical waveform across the output of the resonant circuit. Embodiments of the single switch topology provide advantages: (1) unlike the conventional topology, a symmetrical square waveform is able to be generated at the input of the resonant circuit by the single switch inverter; (2) the switch also functions as part of the power factor corrector to shape the input line current.

The switching assembly preferably comprises a MOSFET. The presence of the MOSFET is to provide a high frequency square voltage waveform at the input of the resonant circuit. Then the function of the resonant circuit is to: (1) filter out much of the harmonics generated by this square voltage waveform so that the output voltage across the lamp is a close-to-sinusoidal waveform; (2) provide high enough output voltage across the lamp during the lamp ignition phase; (3) provide a DC current path for the single switch inverter.

By reducing the number of switches used in the ballast power circuit, the switch driver circuits and the ballast control circuit can be significantly simplified.

This invention has the ability to work with standard triac or incandescent lamp dimmers to provide dimming for fluorescent lamps.

Other aspects and advantages of embodiments of the invention will be readily apparent to those ordinarily skilled in the art upon a review of the following description.

BRIEF DESCRIPTION OF THE DRAWINGS

Embodiments of the invention will now be described in conjunction with the accompanying drawings, wherein:

FIG. 2a is a high level box diagram of one embodiment of a dimmable, high power factor single switch drive circuit for fluorescent lamps in accordance with the teachings of this invention;

FIG. 2b illustrates a possible high power factor single switch electronic ballast with active power factor correction (PFC) in accordance with the teachings of this invention;

FIG. 2c is one possible embodiment of a detailed schematic of the circuit of FIG. 2a;

Figure 1:
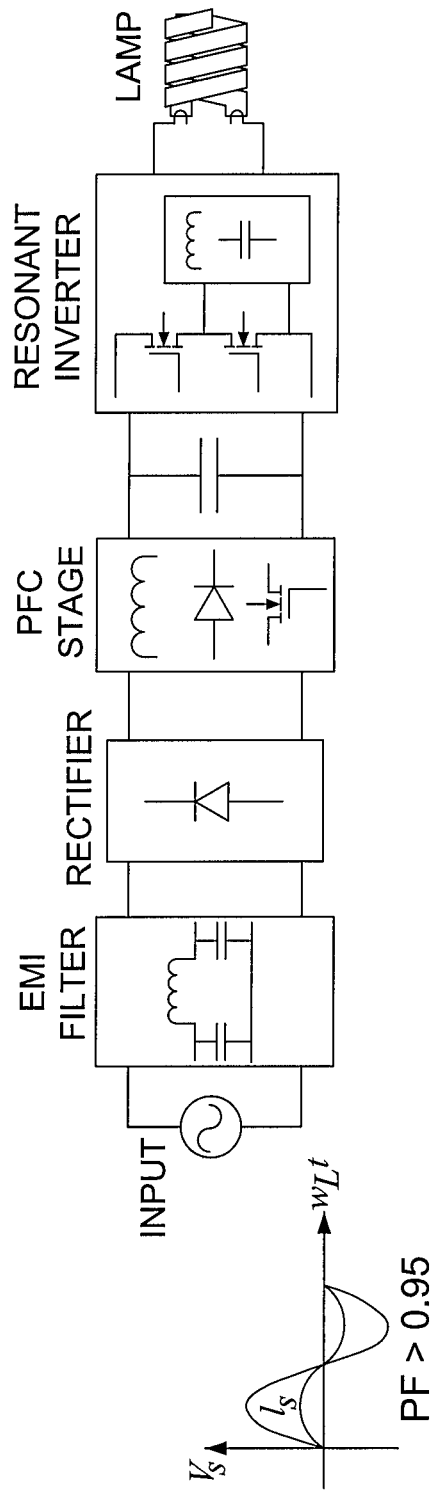
FIG. 1 illustrates a block diagram of an electronic ballast currently available in commercial fluorescent lamps.

This invention will now be described in detail with respect to certain specific representative embodiments thereof, the materials, apparatus and process steps being understood as examples that are intended to be illustrative only. In particular, the invention is not intended to be limited to the methods, materials, conditions, process parameters, apparatus and the like specifically recited herein.

DETAILED DESCRIPTION OF THE DISCLOSED EMBODIMENTS

A single switch integrated electronic ballast circuit 10 for fluorescent lamps is disclosed. FIG. 2a shows a high level figure of the circuit 10. There is an input for receiving a rectified DC voltage 12. A power factor correction portion 14 shapes the input line current to substantially a sinusoidal waveform and in phase with the rectified DC voltage, thereby achieving high input power factor. An energy storage portion 16 stores energy during dimming operations. An inverter with a resonant tank 18 converts the DC voltage to an AC voltage to be delivered to the lamp.

The ballast circuit 10 in accordance with these teachings comprises a single switch or controller 20. The function of the switch 20 is to provide a square voltage waveform across the input of the resonant circuit 18, thereby providing a more symmetrical waveform across the output of the resonant circuit. The innovation of this single switch topology is that: (1) unlike the conventional topology, a symmetrical square waveform is able to be generated at the input of the resonant circuit by the single switch inverter; (2) the switch also functions as part of the power factor corrector (PFC) to shape the input line current.

Figure 12B:
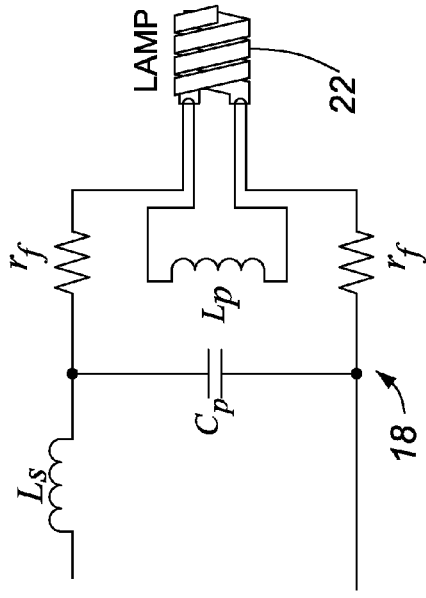
FIGS. 12, a, b, c and d illustrate some possible resonant circuit configurations in accordance with the teachings of this invention.
Figure 12D:
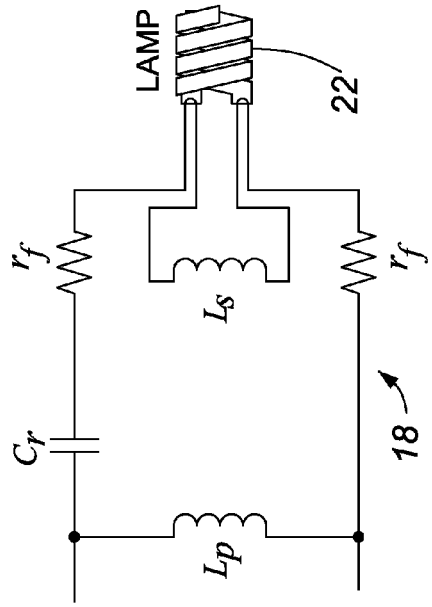
Figure 12A:
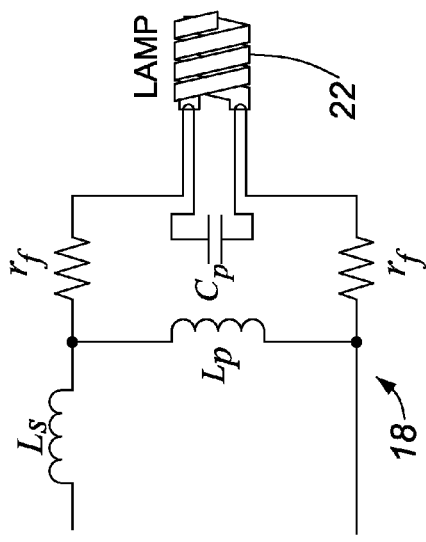
Figure 12C:
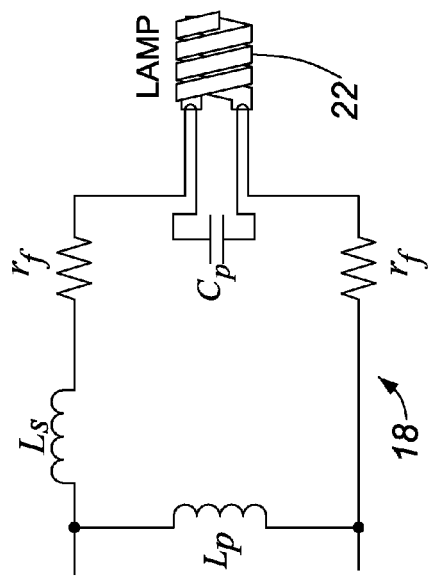

FIG. 2b illustrates another possible high power factor single switch electronic ballast circuit 10 with active PFC. As illustrated, the resonant circuit 18 at the inverter side can be any three-circuit-elements resonant tank where $r_f$ represents the filament resistance of the lamp. FIGS. 12 (a), (b), (c) or (d) can be used as the resonant circuit 18 for the proposed electronic ballast 10 shown in FIG. 2a or 2b. In FIG. 12(a), a parallel inductor is connected on the output side of the resonant circuit 18, with the capacitor represents the lamp starting element. An alternative way to connect the parallel inductor is shown in FIG. 12(c), where this inductor is connected across the input side of the resonant circuit 18. In contrast, the lamp starting element is an inductor in FIG. 12(b) and (d). In addition, the series resonant capacitor shown in FIG. 12(d) can also be used as the DC-block capacitor. Moreover, any resonant tank 18 that provides a DC current path can also be used in this topology.

Figure 2C:
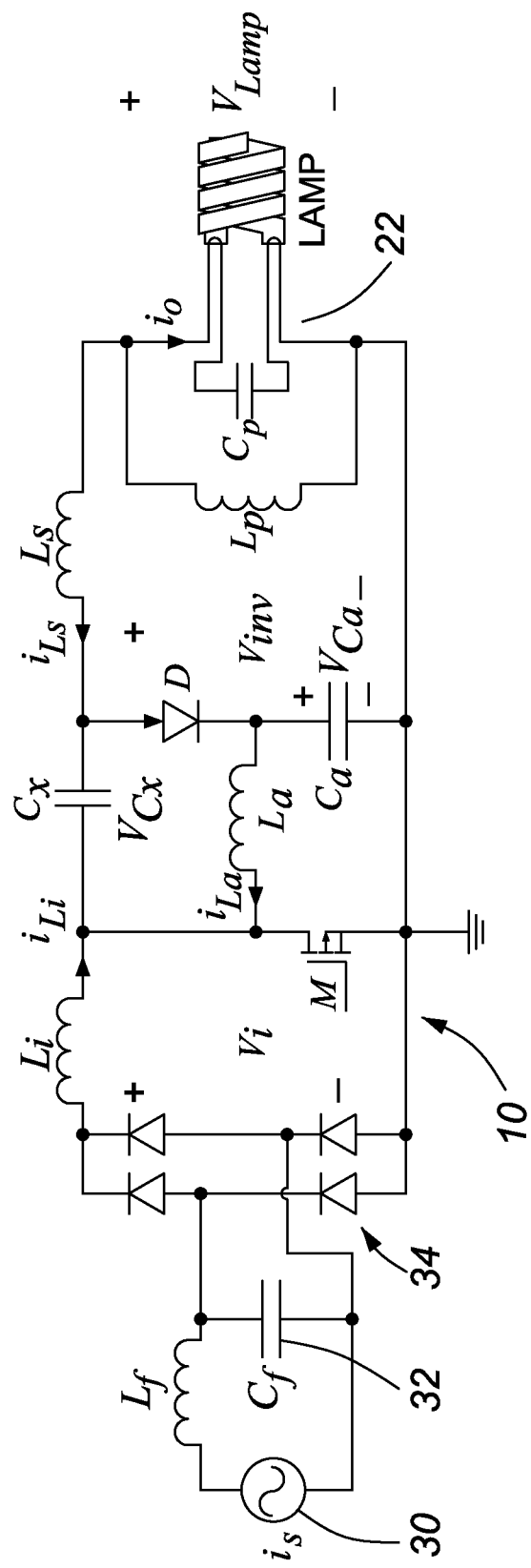

The switching assembly preferably comprises a MOSEFT (M, seen in FIG. 2c). The presence of the MOSFET is to provide a high frequency square voltage waveform at the input of the resonant circuit. Then the function of the resonant circuit is to: (1) filter out much of the harmonics generated by this square voltage waveform so that the output voltage across the lamp is a close-to-sinusoidal waveform; (2) provide high enough output voltage across the lamp during the lamp ignition phase; (3) provide a DC current path for the single switch inverter.

The ballast circuit 10 combines the functions of a power factor correction circuit 14, energy storage circuit 16 and a resonant invert circuit 18. The ballast circuit 10 receives a DC input from the rectifier 22 (seen in FIG. 2c) and outputs a high-frequency sinusoidal AC voltage to the lamp. This single switch topology incorporate the functions of a power factor corrector 14 and the resonant inverter 18 into one stage and at the same time eliminates the use of complicated driver circuit and removes large size capacitors that would otherwise be required by the conventional designs. It demonstrates significant performance improvement on the poor power factor issue while at the same time delivering low cost.

FIGS. 2c shows one embodiment of a detailed circuit diagram of the proposed dimmable, high power factor ballast for compact fluorescent lamps. It can be seen the there is an AC input source 30, filter 32 and rectifier 34, all of which are conventionally known in the art. No further explanation is provided as one skilled in the art will understand the operation and function of these components.

Components of the single-stage ballast circuit perform multiple functions. The components that function as part of the power factor correction circuit include a PFC inductor ($L_i$), the switch (M), the diode (D), and the direct energy store capacitor ($C_x$), auxiliary energy store capacitor ($C_a$). Components that function as part of the energy storage circuit include auxiliary inductor $L_a$, the direct energy store capacitor ($C_x$), auxiliary energy store capacitor ($C_a$). Components that function as part of the resonant inverter include the switch (M), the diode (D), auxiliary inductor $L_a$, the direct energy store capacitor ($C_x$), auxiliary energy store capacitor ($C_a$), series inductor $L_s$, parallel inductor $L_p$ and parallel capacitor $C_p$. Thus in this way, it can be seen that the circuit is an integrated circuit wherein the functions of the power factor correction portion, energy storage portion and the resonant circuit are integrated to require only one switch.

It can be seen that the auxiliary energy store capacitor and the direct energy store capacitor are connected in series. The auxiliary inductor is connected in series with the auxiliary energy store capacitor, and the PFC inductor is connected in series with both the auxiliary energy store capacitor and the direct energy store capacitor. The capacitors ($C_x$ and $C_a$) are connected in series as the boost output filter, which split the boost output voltage by half. The PFC inductor ($L_i$) boosts energy to the direct energy store capacitor ($C_x$) and auxiliary energy store capacitor ($C_a$). The inductor $L_a$ boosts energy from $C_a$ to $C_x$. When switch M is turned on, $C_x$ transfers energy directly to the resonant tank. The capacitors ($C_x$ and $C_a$) clamp the voltage of MOSFET and diode when they are turned off. The resonant tank ($L_a$, $L_p$ and $C_p$) provides sufficient voltage to trigger lamps and provides required power to the lamp (matching the lamp impedance).

Thus the integrated drive circuit works as an inverter bridge, which generates a high frequency AC voltage to the output resonant tank from the rectified input voltage. Both bulk capacitors ($C_x$ and $C_a$) work as energy-store components when dimming.

The converter operates in discontinuous current mode (DCM), since the diode current diminishes to zero, when the current of the PFC inductor ($L_i$) is zero and the currents of the inductors ($L_a$ and $L_s$) are equal. After the diode goes to zero, the inductors ($L_a$//$L_s$) and the output parasitic capacitance of the MOSFET and the diode will begin resonance, which brings the drain-to-source voltage of MOSFET down, which significantly reduces turn-on losses of the MOSFET. The MOSFET is also turned on with ZCS and the diode is turned off with ZCS.

Advantages of the proposed single switch topology is that despite of using only a single switch in the power circuit to reduce the cost of the semiconductor devices required in the ballast power circuit, both the voltage and current stress across the switch can be maintained at a much lower level than other conventional single switch topologies that were used in lighting applications. Embodiments of this invention provide a more energy efficient design approach for electronic ballast in the compact fluorescent lightings environment.

Figure 3:
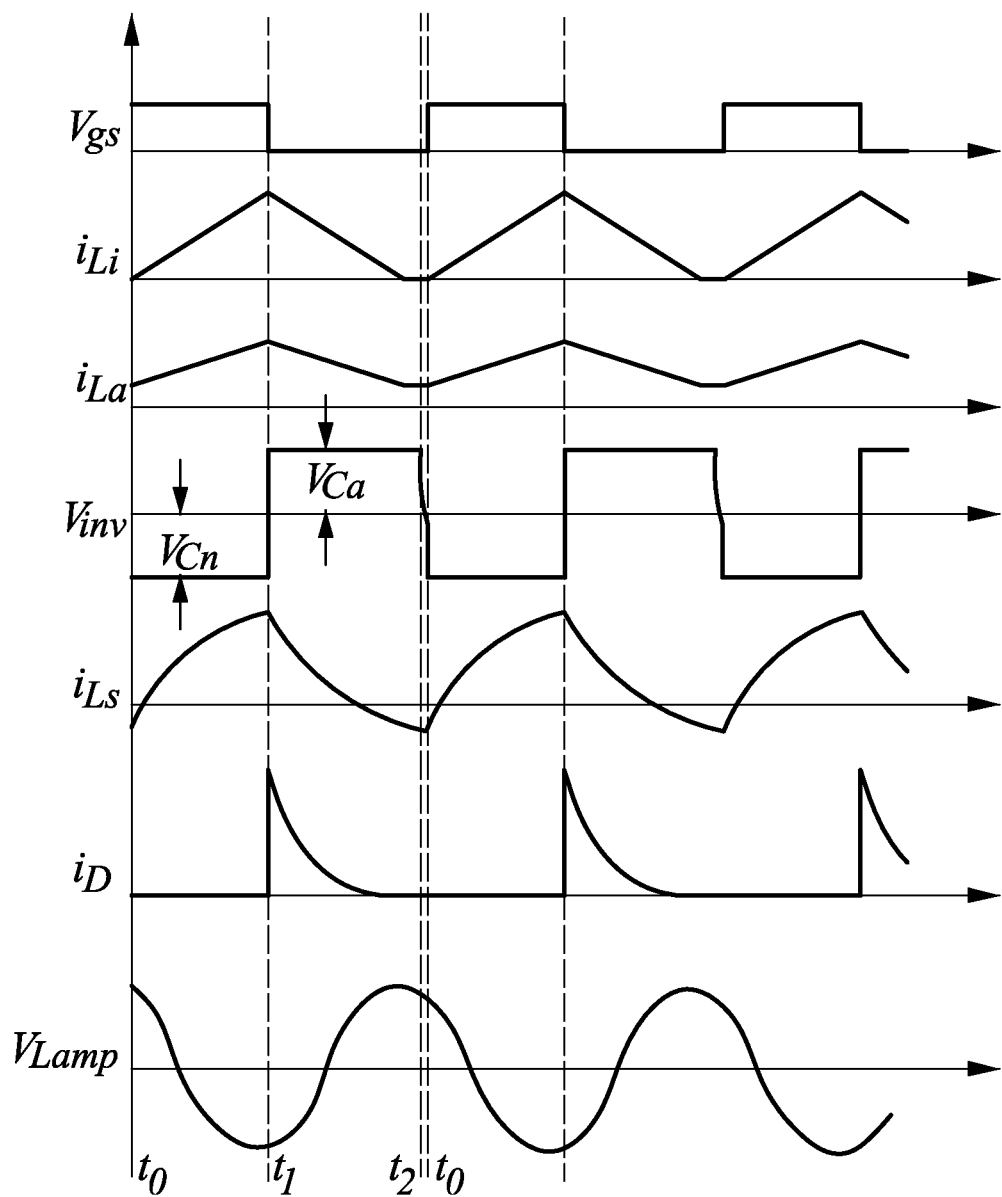
FIG. 3 illustrates typical operation waveforms of the circuit of FIG. 2c.

FIG. 3 shows the typical steady-state operation waveforms of the proposed ballast circuit. It is assumed that: 1) the voltage drop on the on-state MOSFET and the on-state diode is zero; 2) the high frequency voltage ripple on the capacitors ($C_x$ and $C_a$) is neglected and DC voltage on the capacitors ($C_x$ and $C_a$) is $V_{cx}$ and $V_{ca}$, respectively; 3) the switching frequency is much higher than the line frequency; 4) the circuit operates at fixed duty ratio and fixed switching frequency. The steady-state operation of the proposed ballast circuit is brief described as following FIG. 3.

Before $t_0$, switch M is off, the diode is off, and the current $i_{Li}$ through inductor $L_i$ is equal to zero. At $t_0$, switch M is turned on. The current $i_{Li}$ through inductor $L_i$ linearly increases from zero, proportional to the input voltage $V_i$, which is the output voltage of the rectifier bridge. The current through inductor $L_a$ also linearly increases proportional to the capacitor voltage $V_{ca}$. The capacitor $C_x$ is linked to the resonant tank $L_s$, $L_p$, and $C_p$, so a negative voltage ($-V_{cx}$) appears on the input of the resonant tank. The current $i_{Ls}$ through the inductor $L_s$ resonantly increases. A high frequency AC voltage with nearly pure sine waveform is delivered to the lamp.

At $t_1$, switch M is turned off. The diode is forced to conduct. The current $i_{Li}$ through inductor $L_i$ linearly decreases to zero, reset by the capacitors ($C_x$ and $C_a$). The current $i_{La}$ through inductor $L_a$ also linearly decreases, reset by the capacitor $C_x$. Because of conduction of the diode D, the capacitor $C_a$ is linked to the resonant tank and a positive voltage ($V_{ca}$) appears on the input of the resonant tank. The current $i_{Ls}$ through the inductor $L_s$ resonantly decreases.

At $t_2$, the currents through inductors $L_a$ and $L_s$ are equal to each other, but with opposite direction, and the current through inductor $L_i$ is already zero. So the current through the diode D diminishes to zero and the diode is turned off. Then, inductor $L_a$ in parallel with inductor $L_s$ begin to oscillate with the parasitic capacitance of MOSFET and diode, which brings down drain-to-source voltage of MOSFET. This greatly helps to reduce the turn-on switching loss of MOSFET.

At $t_0$, switch M is turned on as scheduled, and a new switching cycle begins.

Simulation and Experimental Verification

A 15 W ballast was designed to verify the operation of the proposed ballast circuit. Typical circuit parameters are shown in FIG. 2.

Figure 4:
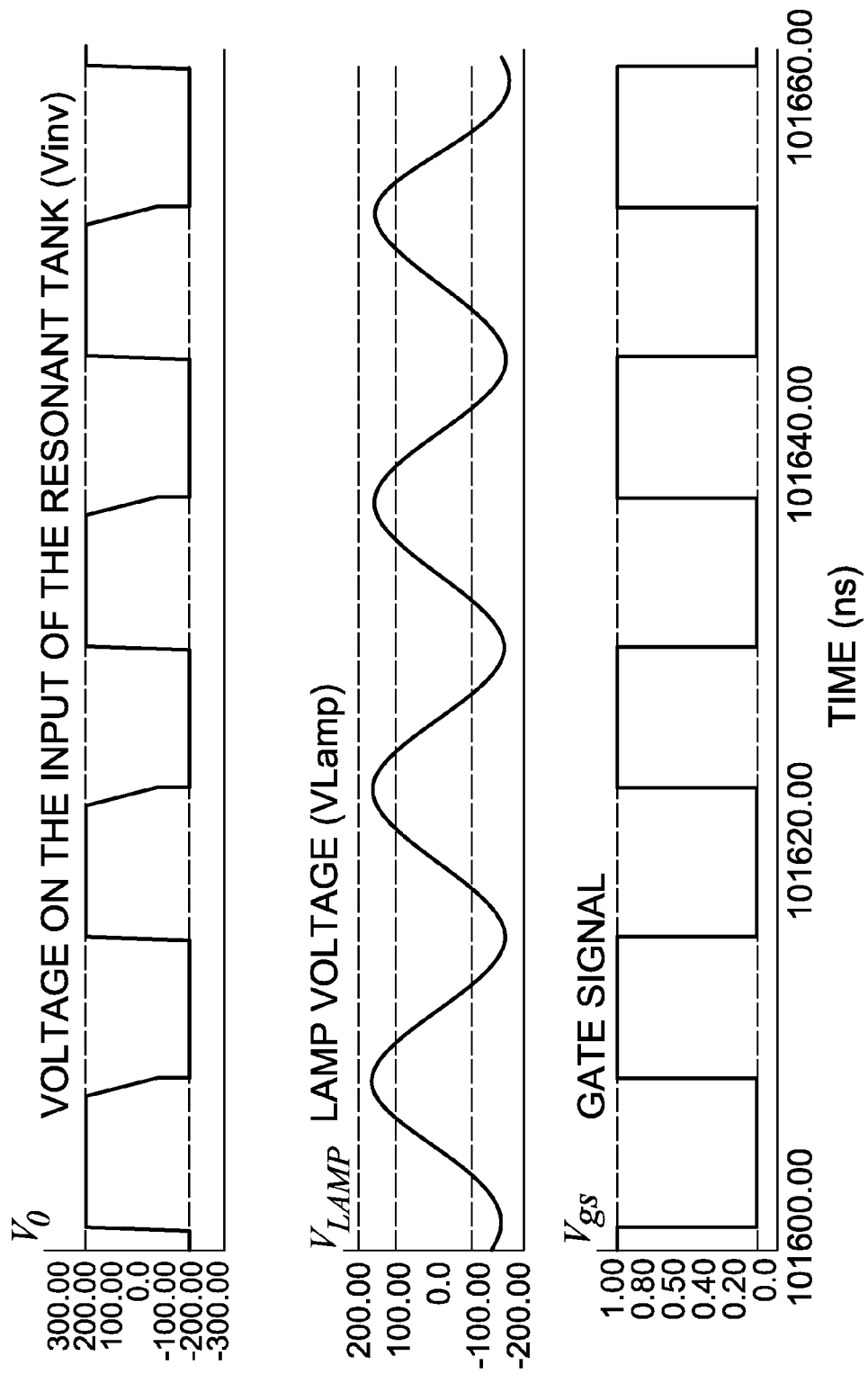
FIG. 4 illustrates the generated inverter voltage and lamp voltage of the circuit of FIG. 2c.
Figure 5:
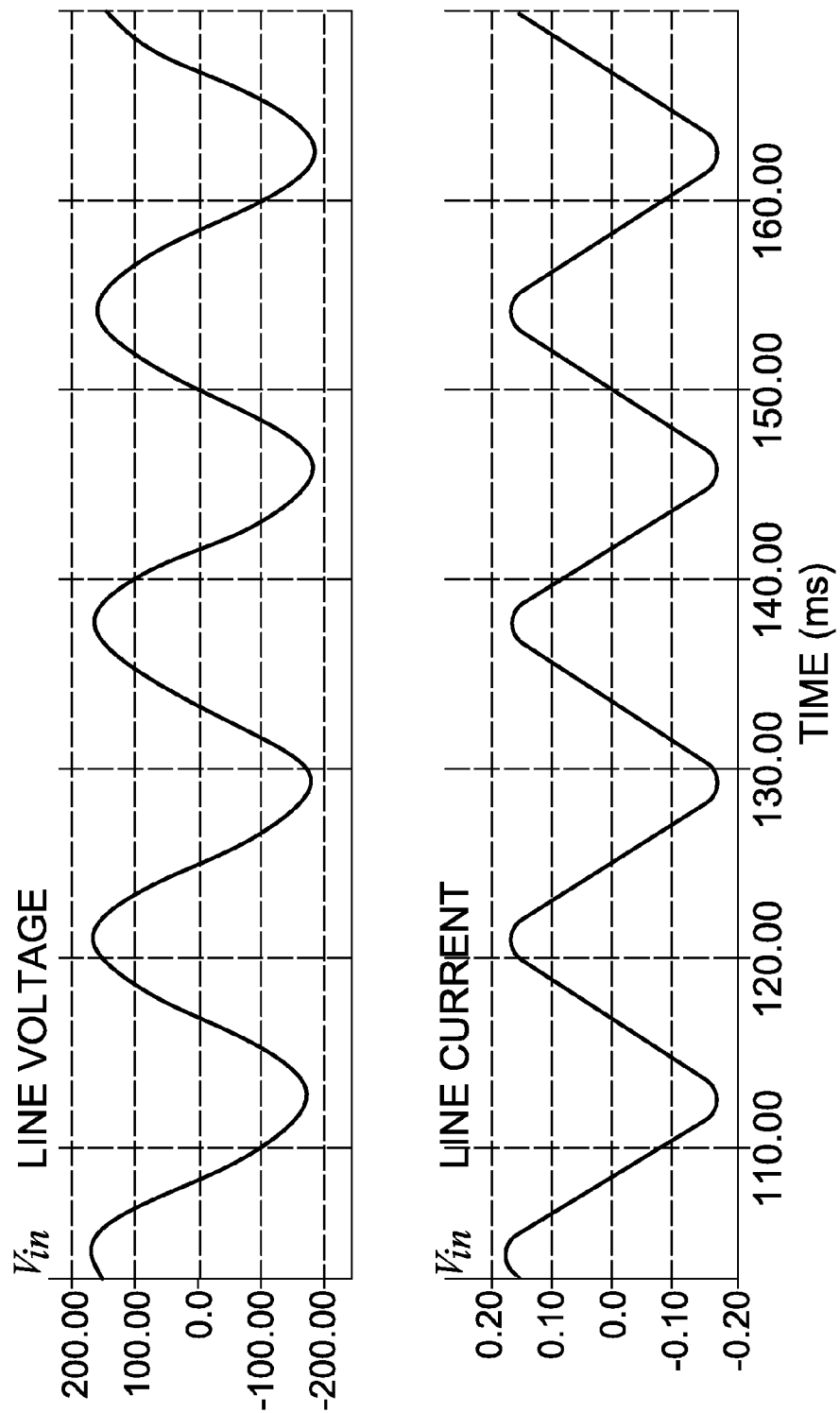
FIG. 5 illustrates line voltage and current of the circuit of FIG. 2c.

FIG. 4 shows the generated inverter voltage and the lamp voltage in simulation. A high frequency AC voltage with nearly pure sine waveform is achieved on the lamp. FIG. 5 shows the line voltage and the line current. The line current is in phase with the line voltage and has a good sine wave sharp. The power factor is measured to be 0.99.

Figure 6:
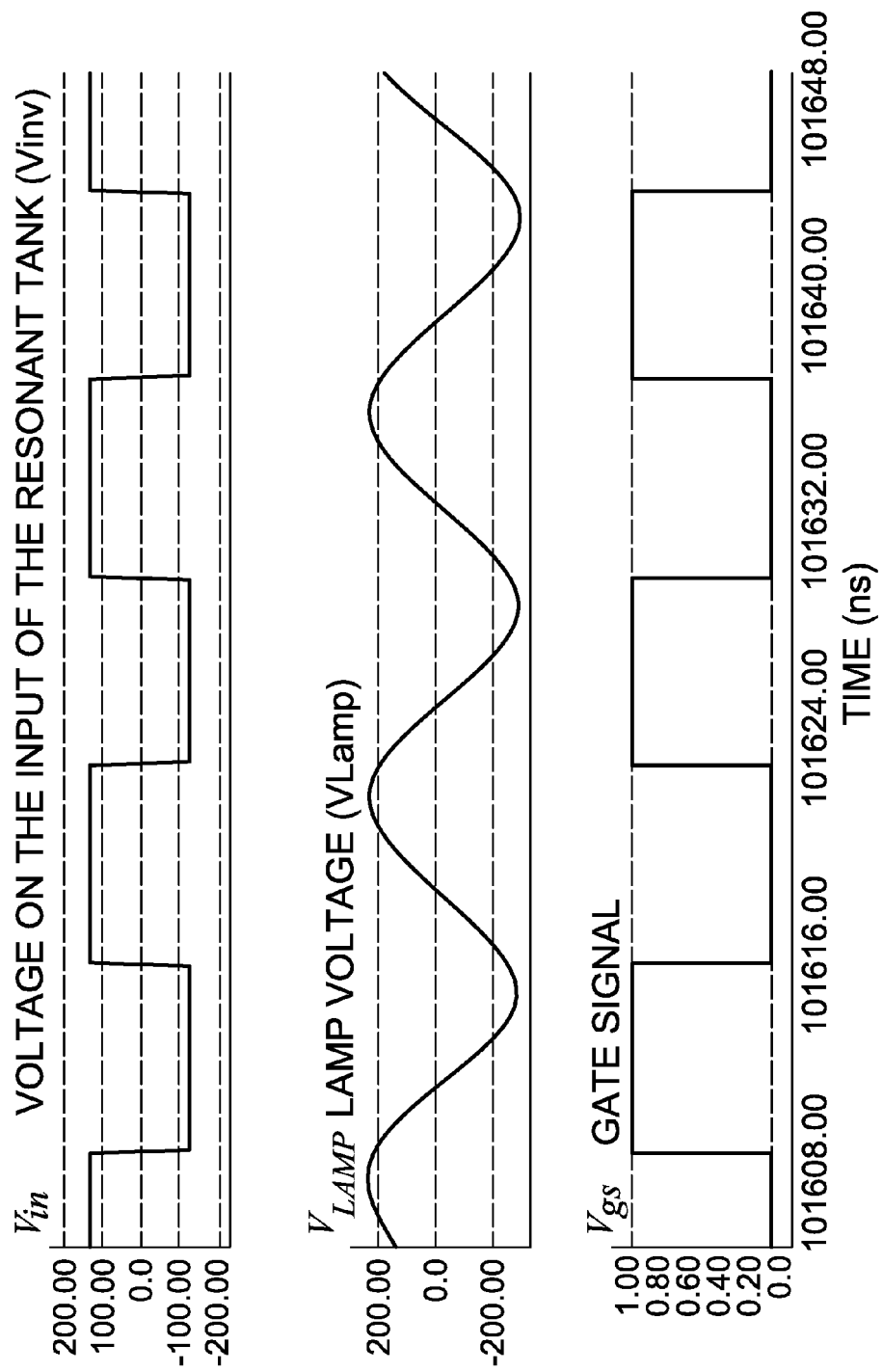
FIG. 6 illustrates generate inverter voltage and lamp voltage when dimming of the circuit of FIG. 2c.
Figure 7:
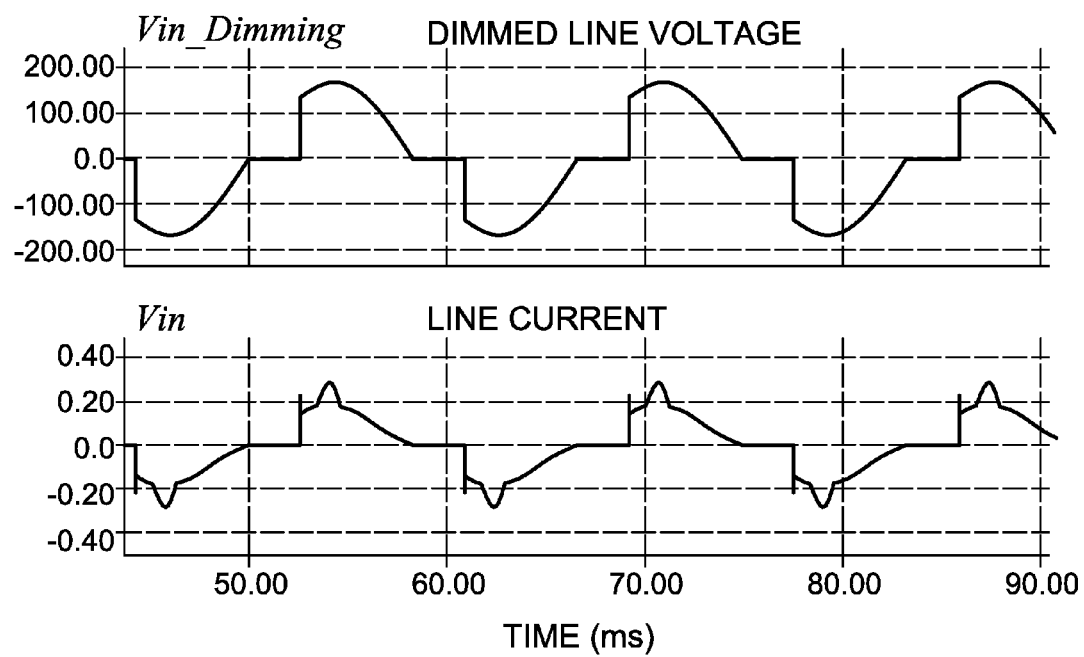
FIG. 7 illustrates dimmed line voltage and current of the circuit of FIG. 2c.

FIG. 6 shows the generated inverter voltage and the lamp voltage when dimming. FIG. 7 shows dimmed line voltage and line current. The power factor is 0.88.

Figure 8:
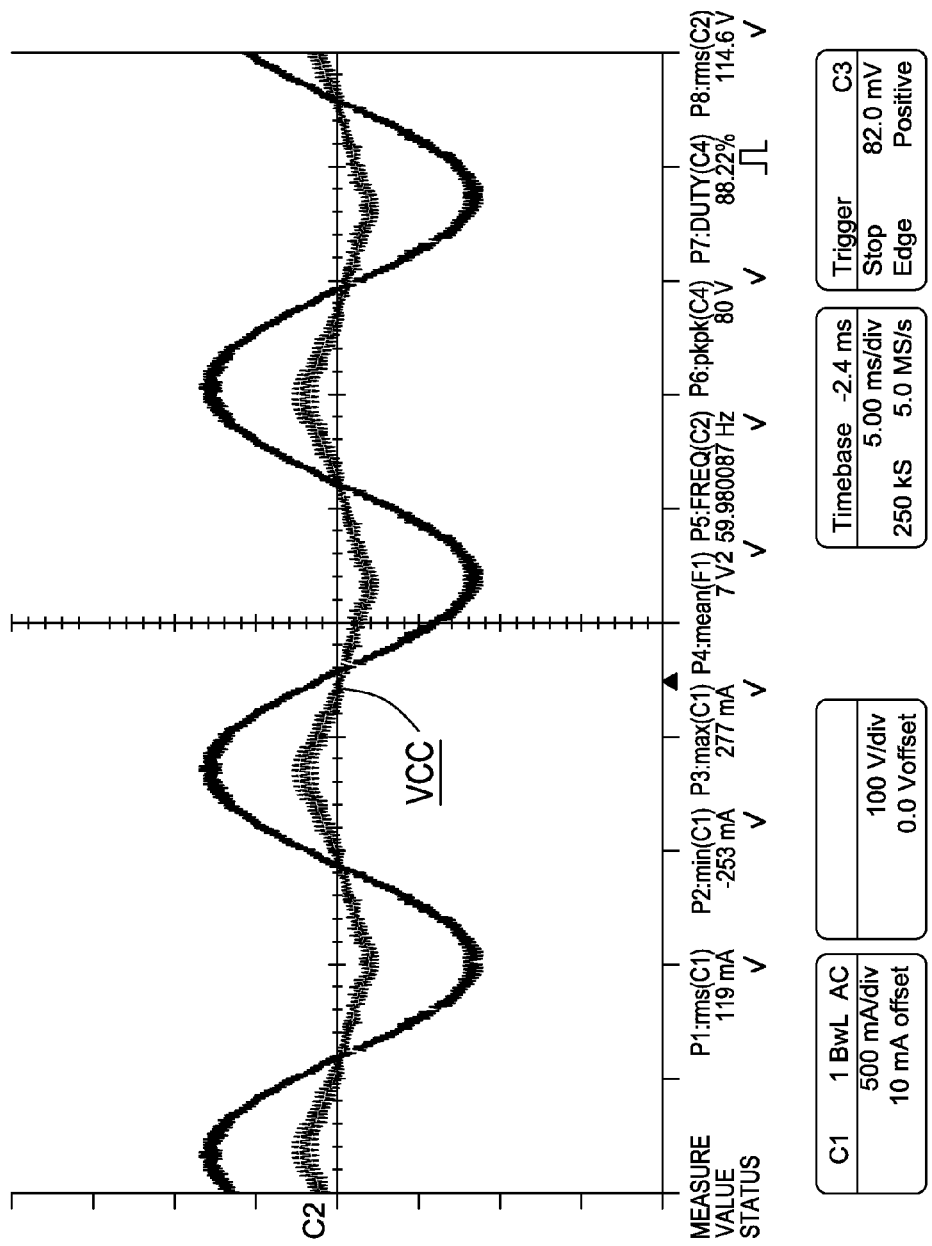
FIG. 8 shows the tested line voltage and line current without dimming of the circuit of FIG. 2c.
Figure 9:
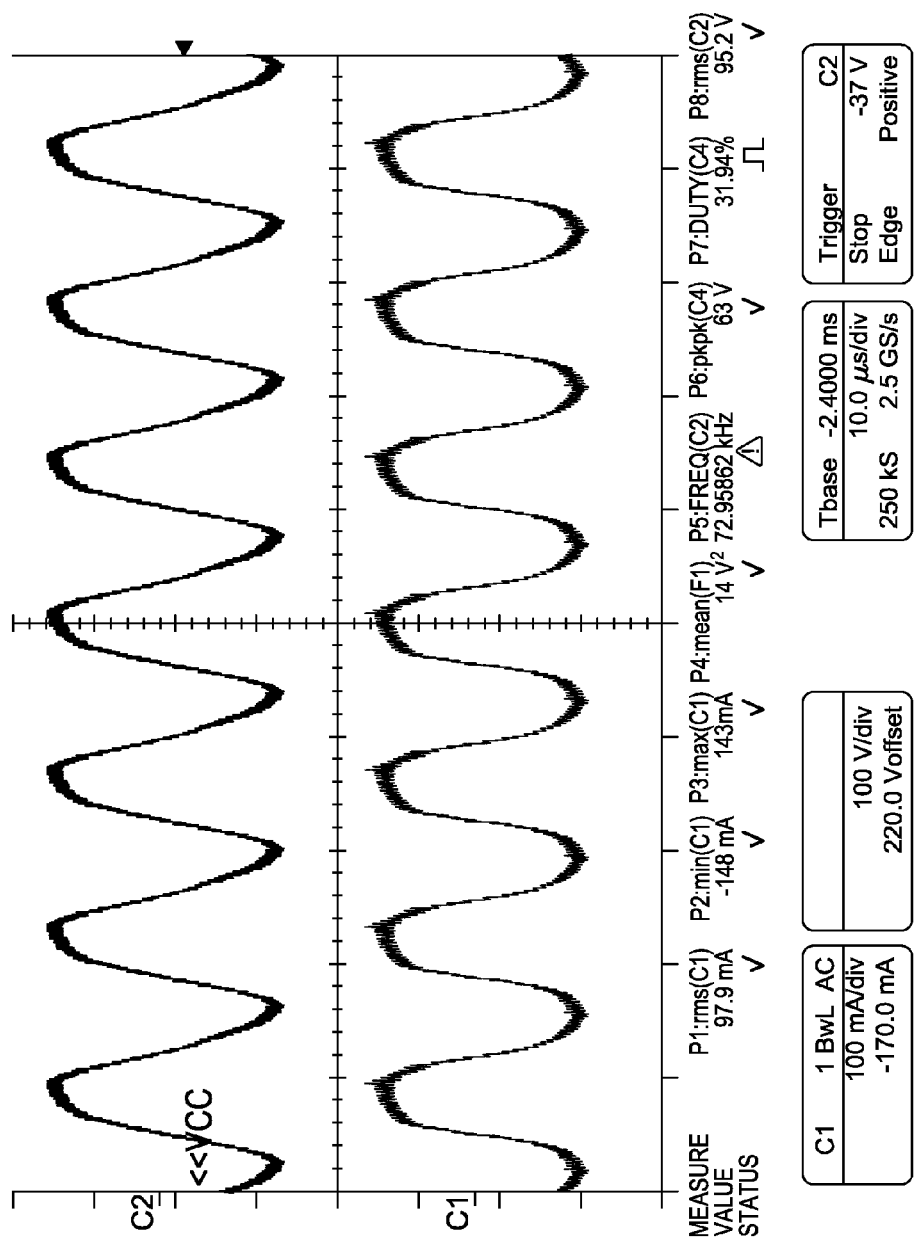
FIG. 9 shows the tested lamp voltage and lamp current without dimming of the circuit of FIG. 2c.
Figure 10:
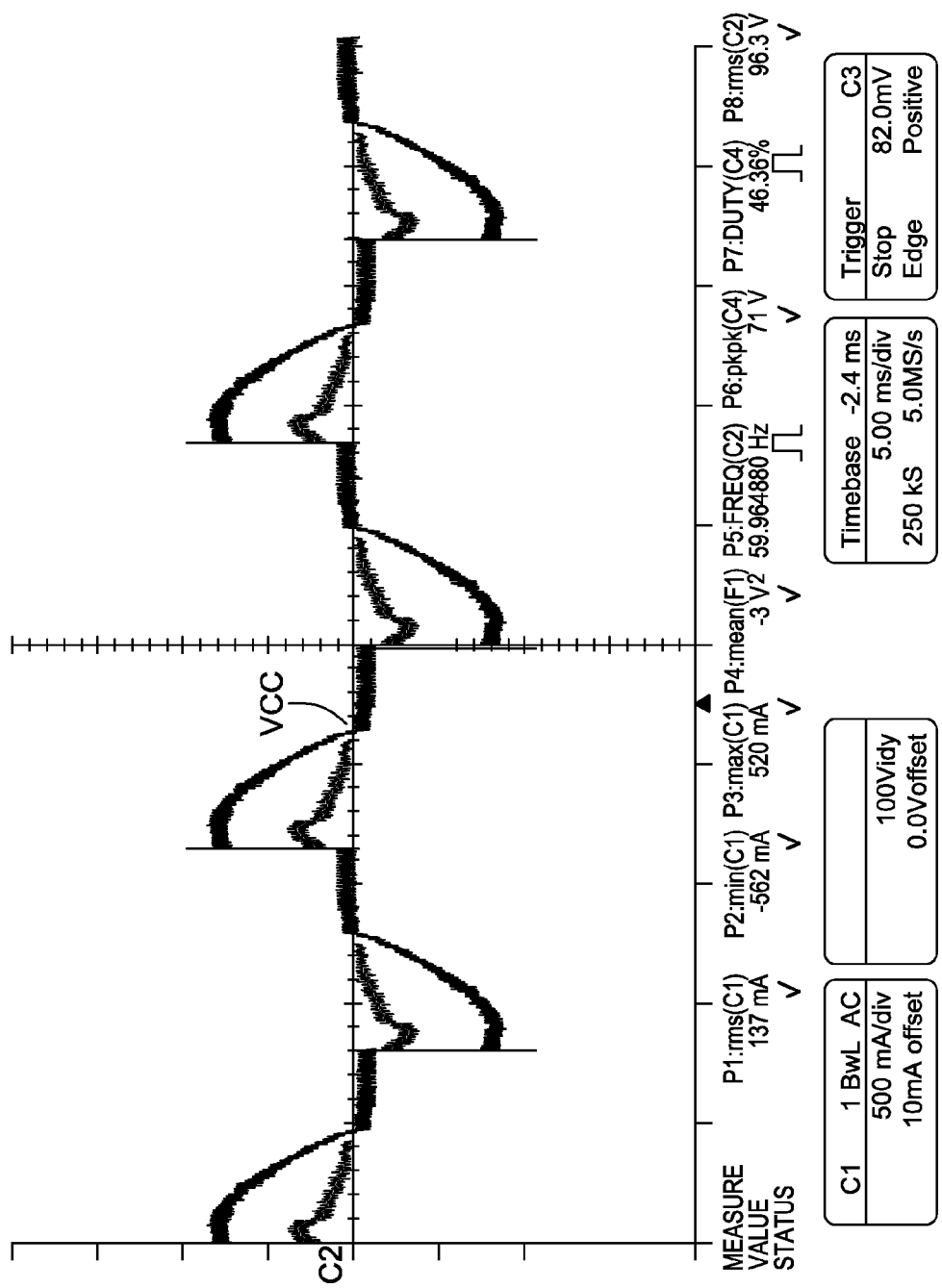
FIG. 10 shows the tested line voltage and line current with dimming of the circuit of FIG. 2c.
Figure 11:
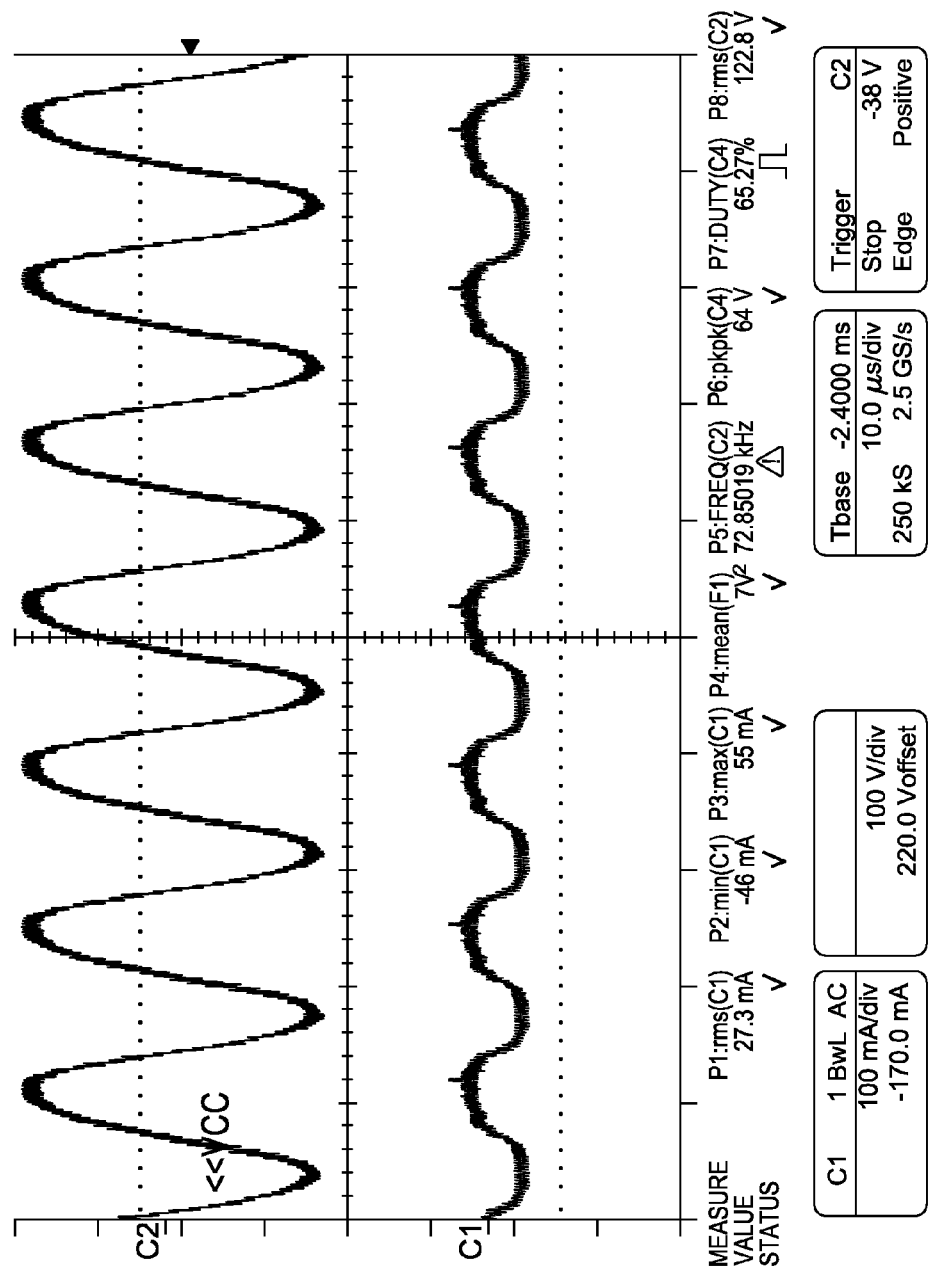
FIG. 11 shows the tested lamp voltage and lamp current with dimming of the circuit of FIG. 2c.

A prototype of the proposed topology has been built for verification. FIG. 8 shows the line voltage and the line current without dimming. The power factor is measured to be 0.99. FIG. 9 shows the lamp voltage and lamp current without dimming. FIG. 10 shows the line voltage and the line current with dimming. The power factor is measured to be 0.86. FIG. 11 shows the lamp voltage and lamp current with dimming.

Figure 13:
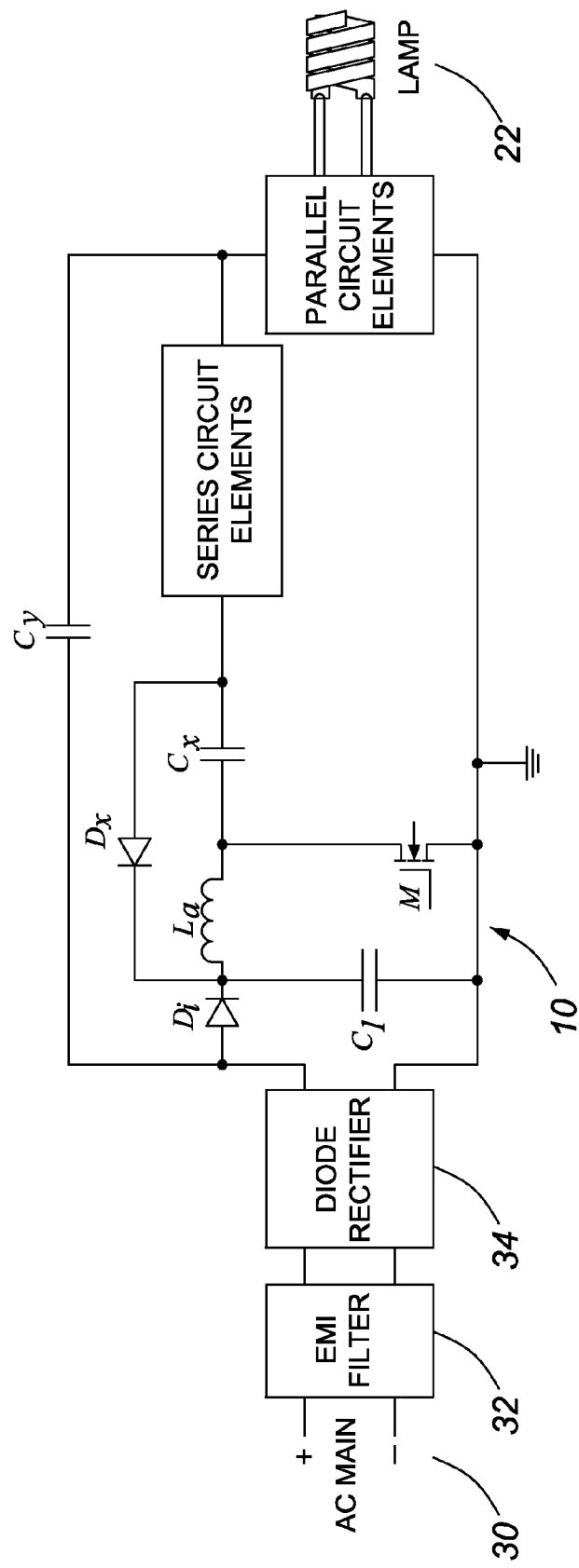
FIG. 13 illustrates an embodiment of a dimmable single-switch electronic ballast with passive PFC in accordance with the teachings of this invention.
Figure 14:
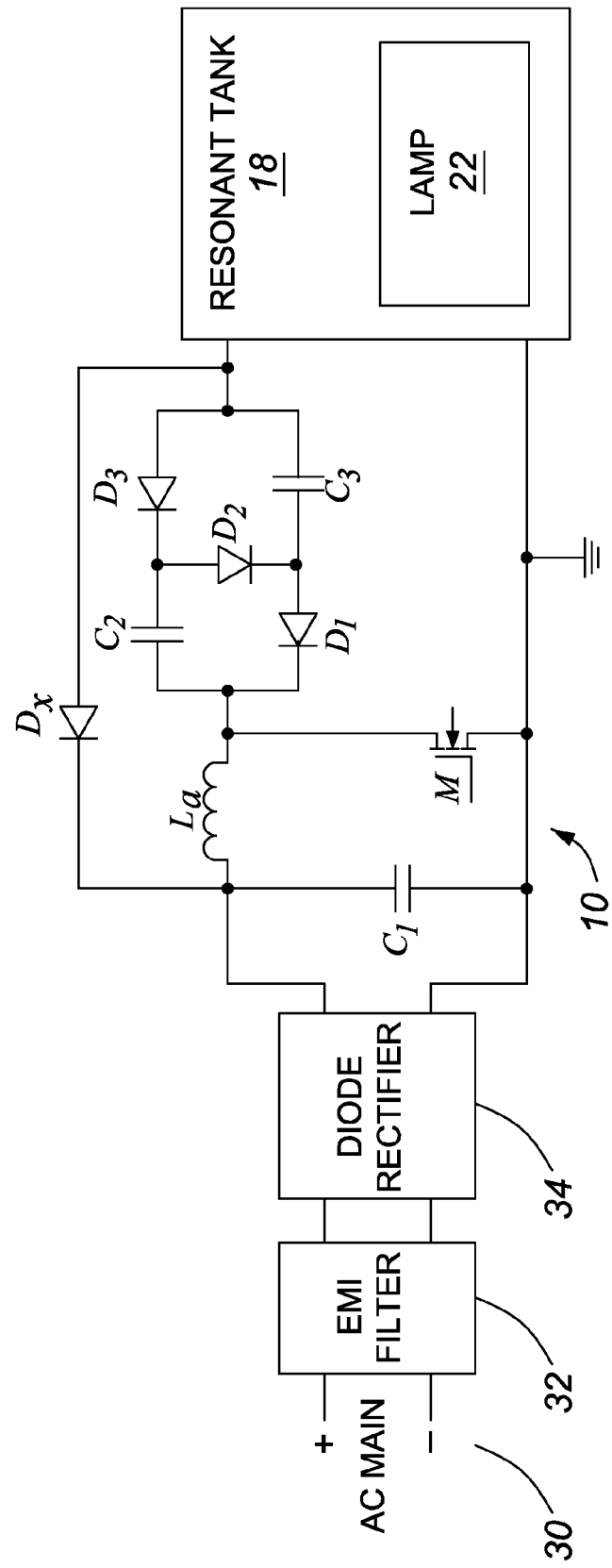
FIGS. 14 and 15 illustrate embodiments of dimmable single-switch electronic ballasts with variable DC voltage in accordance with the teachings of this invention.
Figure 15:
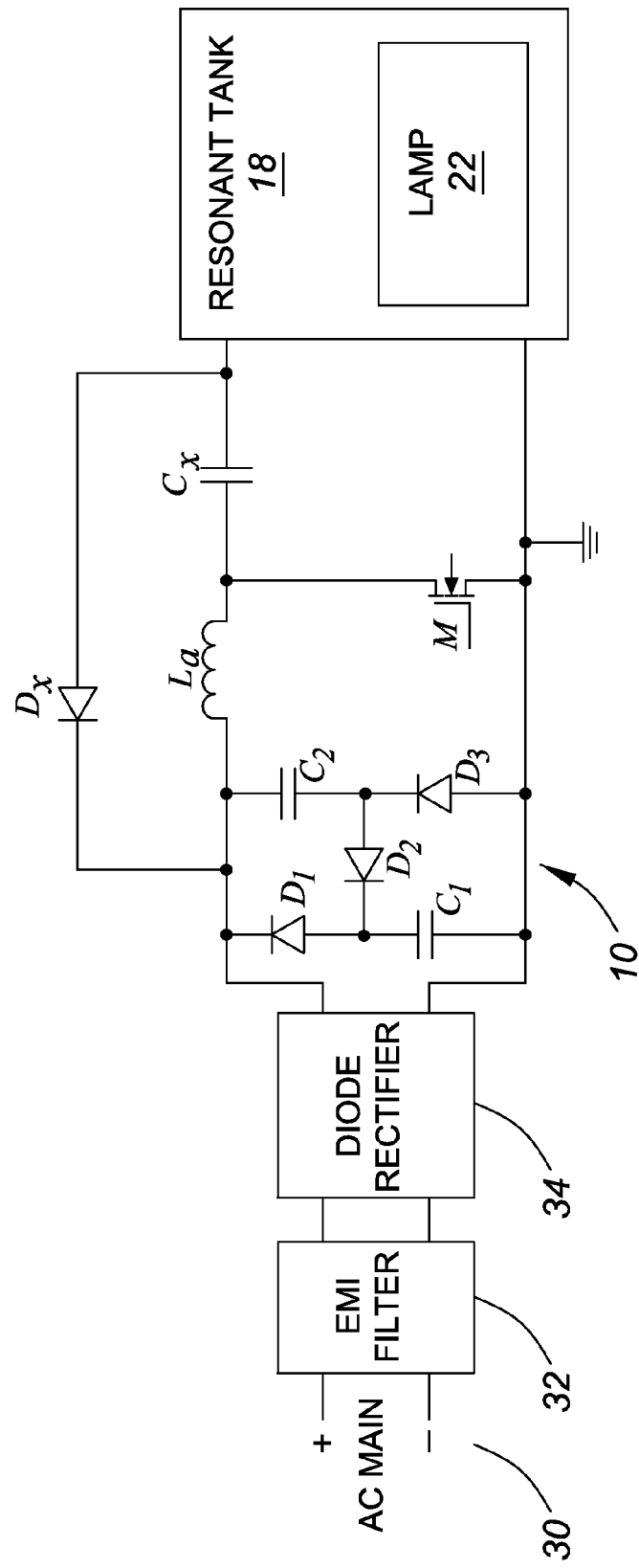

Possible circuit configuration with passive PFC of the proposed dimmable electronic ballast for CFL applications is shown in FIG. 13. In this circuit, passive PFC is used by connecting a capacitor $C_y$ between the output of the rectifier and the output of the resonant circuit. Other possible configurations with passive PFC are shown in FIG. 14 and FIG. 15. The PFC circuit of the embodiments of FIGS. 14 and 15 is composed of $C_2$, $C_3$, $D_1$, $D_2$, $D_3$. Again, any resonant circuit displayed in FIGS. 12, a, b, c and d, can be used for both ballast circuits with passive PFC.

Numerous modifications may be made without departing from the spirit and scope of the invention as defined in the appended claims.

What is claimed is:

1. A single switch integrated electronic ballast circuit for a fluorescent lamp, comprising:
   a diode rectifier for receiving an incoming AC mains voltage and converting the AC mains voltage to a full-wave rectified voltage at an output of the diode rectifier;
   a resonant tank comprising a series inductor, a parallel inductor and a parallel capacitor; and
   a power factor correction circuit comprising two inductors, two energy storage capacitors, a single diode and a single switch, so that in operation, the power factor correction circuit simultaneously provides the following distinct functions:
   (1) shaping a line current of the incoming AC mains voltage to substantially a sinusoidal waveform that is in phase with the AC mains voltage;
   (2) identically charging the two energy storage capacitors to store energy during full power and dimming operations of the lamp; and
   (3) producing a substantially symmetrical high frequency square voltage waveform across the input of the resonant tank;
   the resonant tank converting the substantially symmetrical high frequency square voltage waveform to a substantially symmetrical high frequency sinusoidal AC voltage waveform across the fluorescent lamp without using any additional switch.

2. The single switch integrated electronic ballast circuit of claim 1, wherein the power factor correction circuit and the resonant tank share a common voltage source.

3. The single switch integrated electronic ballast circuit of claim 2, wherein the voltage source is a pair of capacitors.

4. The single switch integrated electronic ballast circuit of claim 3, wherein the pair of capacitors are connected in series to one another.

5. The single switch integrated electronic ballast circuit of claim 1, wherein the switch comprises a MOSFET, and the combination of the switch and two energy storage capacitors provides a high frequency square voltage waveform at the input of the resonant circuit.

6. The single switch integrated electronic ballast circuit of claim 5, wherein the resonant tank comprises a filter to filter the harmonics generated by the square voltage waveform.

7. The single switch integrated electronic ballast circuit of claim 1, wherein the energy storage capacitors are connected in series to split the voltage within the power factor correction portion by half.

8. The single switch integrated electronic ballast circuit of claim 7, wherein the energy storage capacitors also form part of the resonant circuit.

9. The single switch integrated electronic ballast circuit of claim 8, wherein at least one capacitor transfers energy to the lamp when the switch is on.

10. The single switch integrated electronic ballast circuit of claim 9, wherein the dimming operations of the lamp are done by either a TRIAC or incandescent lamp dimmer.

11. The single switch integrated electronic ballast circuit of claim 9, wherein the power factor correction circuit runs in discontinuous mode.

12. The single switch integrated electronic ballast of claim 1, wherein the fluorescent lamp is a compact fluorescent lamp.

13. The single switch integrated electronic ballast of claim 1, wherein the power factor correction circuit is active.

14. The single switch integrated electronic ballast of claim 1, wherein the power factor correction circuit is passive.

* * * * *